March 21, 1939.    L. CODDINGTON    2,151,189
VARIABLE SPEED TRANSMISSION MECHANISM
Filed May 17, 1937    2 Sheets-Sheet 1
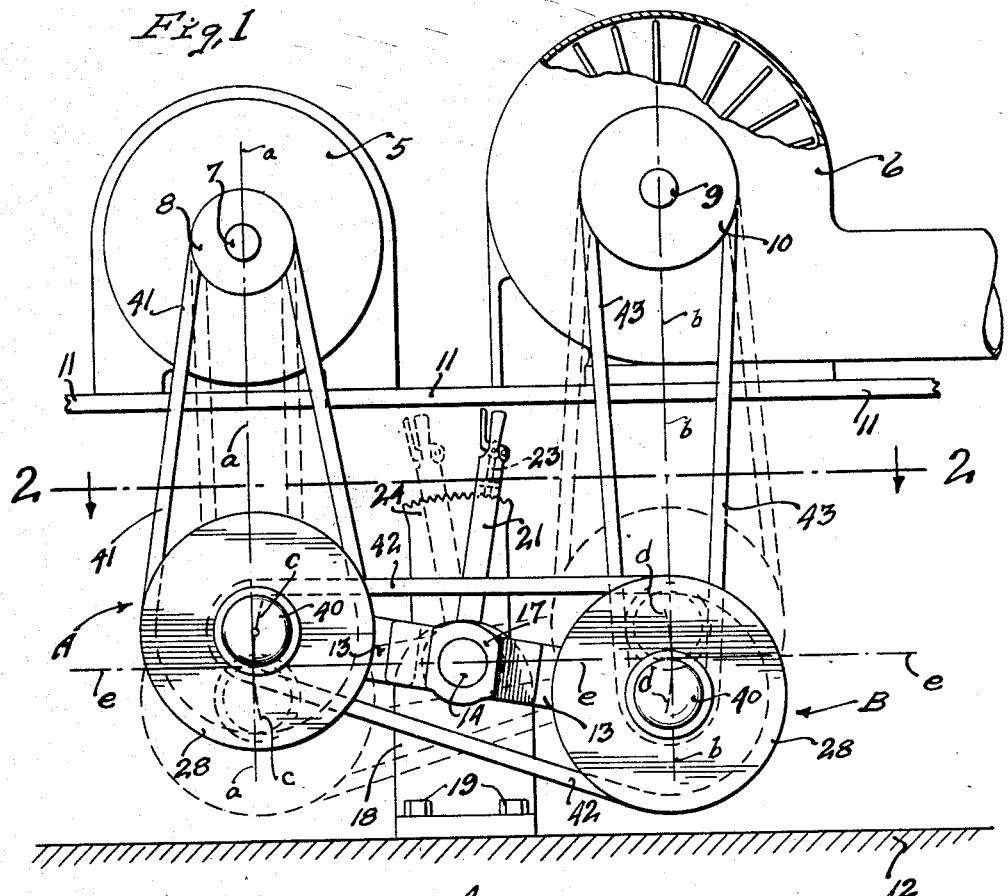
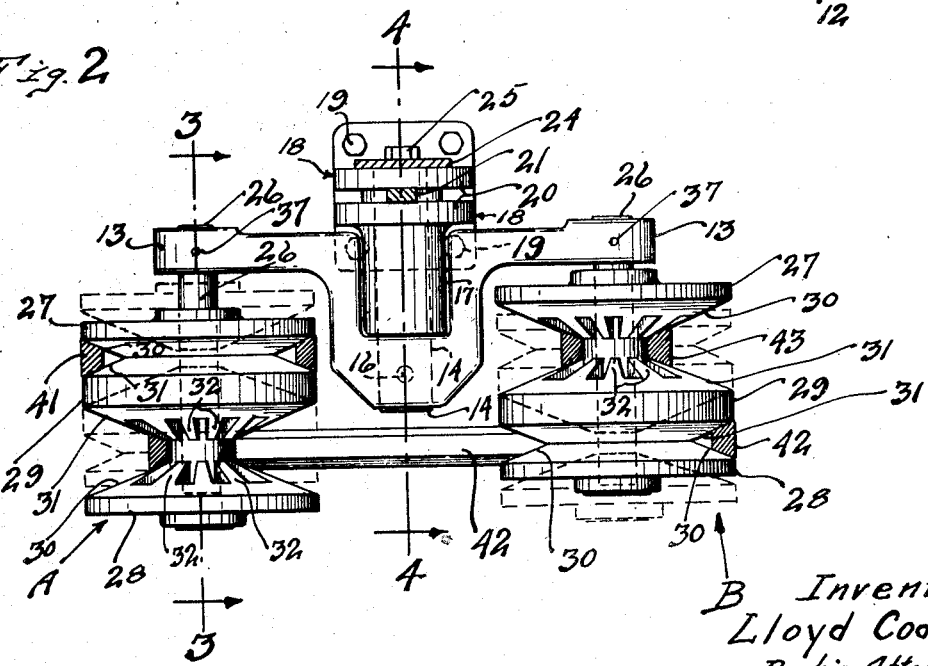
Inventor
Lloyd Coddington
By his Attorneys March 21, 1939.   L. CODDINGTON   2,151,189
VARIABLE SPEED TRANSMISSION MECHANISM
Filed May 17, 1937   2 Sheets-Sheet 2

Inventor
Lloyd Coddington
By his Attorneys
Merchant & Kilgore

Patented Mar. 21, 1939

2,151,189

UNITED STATES PATENT OFFICE 2,151,189

VARIABLE SPEED TRANSMISSION MECHANISM

Lloyd Coddington, Minneapolis, Minn., assignor to Continental Machine Specialties, Inc., Minneapolis, Minn., a corporation of Minnesota Application May 17, 1937, Serial No. 143,039

20 Claims. (Cl. 74—230.17)

My present invention relates to improvements in variable speed transmission mechanisms of the general character often referred to in the trade as variable speed pulleys. More specifically stated, it may be said that the present invention relates to that general class of transmission mechanisms of the type incorporating belts which run over opposed conical faces of opposite pulley sections that are mounted for relative axial adjustments, so as to vary the effective or operating diameter thereof, to thereby vary the speed ratio.

The present transmission mechanism, like most of its predecessors, is adapted to be interposed in the driving connections between a source of power, such as a motor and a load to be driven from the motor, to vary the speed ratio between the source of power and load. The transmission mechanism of the present invention, however, has numerous important advantages over prior devices of this general character, among which are (a) the ability to obtain unusually great speed ratio variation from a transmission unit of relatively small physical dimensions and through the use of relatively small diameter pulleys, (b) the provision of a highly efficient, comparatively inexpensive and substantially trouble-free transmission unit capable of wide speed ratio variation, and (c) the provision of a transmission mechanism of the character described which may be coupled between a source of power and load to be driven therefrom in such a manner as to permit an unusually compact arrangement of the entirety consisting of the source of power, transmission mechanism and the device driven from the source through the transmission mechanism.

In the prior art transmission mechanisms of this general character transmission units have usually been placed substantially in the plane of a line drawn between the power source and load device. This stringing out of the motor or power unit, transmission mechanism and driven device or load in a comparatively straight line arrangement has always been objectionable, due to the relatively great area covered by the assembly, but such relative arrangement of the parts has hitherto been a necessary limitation imposed by prior art constructions.

In the preferred embodiment of my present invention herein illustrated the necessity of stringing co-operating units out in aligned arrangement is entirely eliminated and a compact, more or less rectangular arrangement of the parts is made possible.

Another important object of the invention is the provision of a variable speed transmission mechanism of the general character described in which alignment between the various pulleys and belts is automatically maintained throughout the entire range of variable speed ratio adjustment of a transmission mechanism. The above and other highly important objects and advantages of the invention will be made apparent from the following specification and claims.

In the accompanying drawings like characters indicate like parts throughout the several views.

Referring to the drawings:

Fig. 1 is a view of a preferred embodiment of one of my improved transmission mechanisms illustrating the same interposed in the driving connections between a source of power and load device;

Fig. 2 is a transverse horizontal sectional view taken on the line 2—2 of Fig. 1 and looking downwardly;

Figure 3:
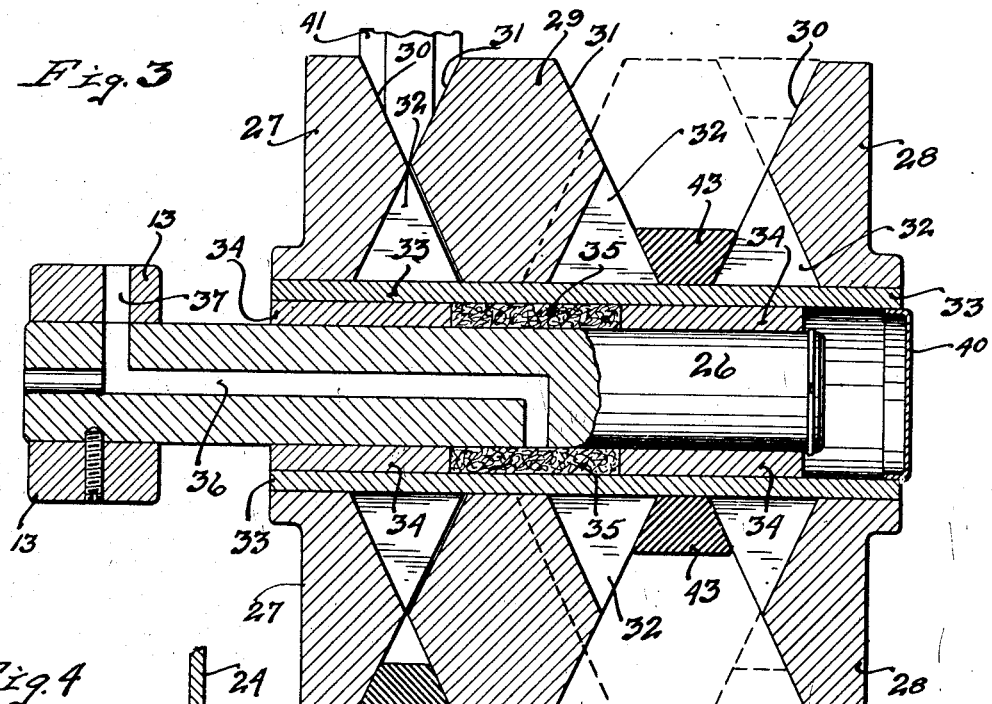
Fig. 3 is an enlarged detail sectional view taken on the line 3—3 of Fig. 2.
Figure 4:
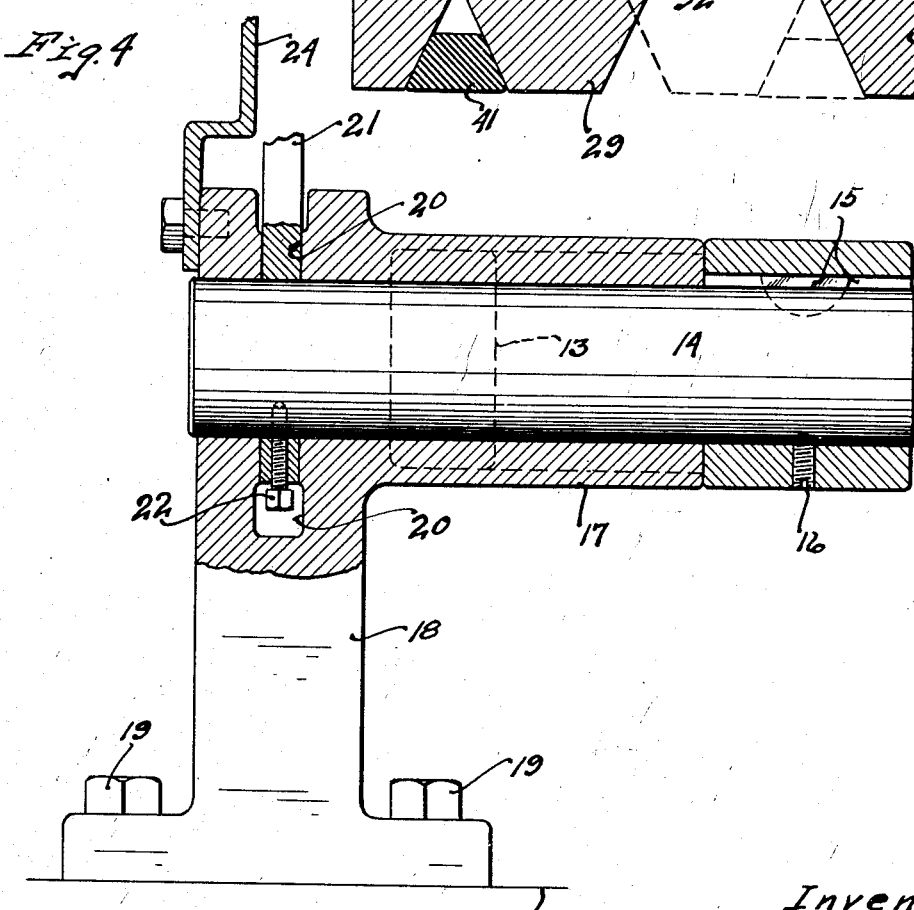
Fig. 4 is an enlarged sectional detail view with some parts broken away taken on the line 4—4 of Fig. 2.

With reference particularly to Fig. 1, a source of power in the nature of an electric motor 5 is shown as coupled to a load device in the nature of a centrifugal type fan or blower 6 through the medium of suitable driving connections, inclusive of the transmission mechanism shortly to be described in detail. The rotor shaft 7 of the motor 5 is provided with a V-groove drive pulley 8, and the shaft 9 of the blower 6 is provided with a similar V-groove pulley 10. Hereinafter the shaft 7 and pulley 8 may be referred to respectively as the driving shaft and driving pulley, and the shaft 9 and pulley 10 respectively as the driven shaft and driven pulley. In the preferred arrangement of parts herein illustrated the motor 5 and blower 6 are mounted on a common base of support 11 which is parallel to but spaced from a lower supporting structure 12, which latter may be assumed to be the floor of a building.

The preferred form of transmission mechanism herein illustrated includes two like multiple section pulley units A and B that are supported in laterally spaced relation at opposite ends of an intermediately pivoted supporting structure in the nature of a rock arm 13. The supporting rock arm 13 is mounted fast on the end of a rock shaft 14 by means of a key or keyway 15 and a set screw 16, and the rock shaft 14 is in turn journaled in the extended tubular hub portion 17 of a mounting bracket 18. The mounting bracket 18, which supports the entire unit from the floor or other suitable support 12, is made fast to such supporting surface 12 by bolts or the like 19. Mounted on the rock shaft 14, and working within the confines of a bifurcated upper portion 20 of the supporting bracket 18 is a manually operative speed change lever 21, which lever 21 is made fast on the rock shaft 14 by a set screw or the like 22. For releasably locking the speed change lever 20, rock shaft 14 and rock arm 13 in different adjusted positions, the speed change lever 21 is provided with a finger grip operated pawl 23 that co-operates with a relatively fixed toothed segment 24 that is securely anchored by bolts 25 to the mounting bracket 18.

Mounted fast in and projecting from opposite end portions of the rock arm 13 are crank pins 26, on one of which crank pins the pulley unit A is journaled and on the other of which crank pins the pulley unit B is journaled. The pulley units A and B are each made up of three pulley flanges, to wit: relatively fixed inner and outer flanges 27 and 28, respectively and a cooperating intermediate pulley flange 29 mounted co-axially with the inner and outer pulley flanges 27 and 28 for axial adjustments in respect thereto. The pulley flanges 27 and 28 have radially outwardly diverging conical inner surfaces 30, and the co-operating intermediate pulley flanges 29 have radially outwardly converging conical surfaces 31. To form the conical surfaces 30 and 31 of the pulley flanges 27, 28 and 29 for interlapping movements under extreme adjustments, the conical surfaces 30 and 31 are radially slotted adjacent the axis to form intermeshing teeth 32.

The relatively fixed inner and outer flanges 27 and 28 of each of the pulley units A and B are tightly press-fit onto opposite end portions of a mounting sleeve 33 with their base portions adjacent the sleeve 33 spaced apart a distance approximately equal to that of the maximum width of the intermediate movable pulley flange 29, which maximum width is adjacent the tubular mounting sleeve 33. The intermediate pulley flange 29 of each pulley unit is axially slidably mounted on the intermediate portion of the sleeve 33 of its respective unit for shifting movements, as shown by full and dotted lines. The tubular mounting sleeves 33 are journaled on their respective co-operating crank pins or spindles 26 through the medium of tubular bearing bushings 34 that are snugly press-fit onto opposite end portions of the mounting sleeves 33 in axially spaced relation. The annular space between the bearing bushings 34 surrounding the crank pins 26 is packed with lubricant absorbent material 35 and serves as a lubricant reservoir. For supplying lubricant to these reservoirs the crank pins 26 are drilled to provide oil passages 36 that are aligned with oil passages 37 in the free end portions of the rock arm 13. The pulley units A and B, besides being freely journaled on the crank pins 26, are free to float axially between limits afforded at one end by their respective free end portions of the rock arm 13, and at the other end by stop shoulders 38 on the free end portions of the crank pins 26 that are engaged by the outer bearing bushings 34. The stop shoulders 38 are afforded by split spring rings that are under tension to contract and are forced over the extreme free ends of the crank pins 26 and allowed to seat by their own spring tension in suitable annular grooves 39 in the crank pins.

The outer ends of the mounting sleeves 33, as illustrated, are normally closed by press-in caps 40.

The driving connections of the arrangement illustrated and described are completed by a belt 41 running over the driving pulley 8 of the motor 5 and between the opposed conical flanges 30 and 31 of the inner pulley flange 27 of pulley unit A and the intermediate movable pulley flange 29 of pulley unit A; a similar belt 42 running between the opposed conical surfaces of pulley flanges 28 and 29 of pulley units A and B; and a belt 43 running between the co-operating opposed conical surfaces of flanges 27 and 29 of pulley B and over the driven pulley 10 of the load affording blower 6. The belts 41, 42 and 43 are preferably, and as illustrated, of the commercially available standardized V type.

In accordance with the preferred embodiment of the invention herein illustrated, the axes of the driving pulley 8 and driven pulley 10 are so spaced that a line drawn from the axis of pulley 8 to a point of tangency with the arc of a circle traversed by the axis of pulley unit A, under adjustable rocking or the rock arm 13 on axis 14, will be parallel with the line struck from the axis of pulley 10 to a point of tangency with the arc of a circle traversed by the axis of pulley section B, under adjustable rocking movements of the rock arm 13 on axis 14. (See vertical broken lines $a$, $b$ and broken line circle segments $c$ and $d$.) In the drawings the maximum speed ratio reduction positions of the parts are indicated by full lines, and the minimum speed ratio reduction positions are indicated by dotted lines. Horizontal broken line $e$ intersects the points of tangency of lines $a$ and $b$ with the arcs $c$ and $d$, respectively, and the axis of rotation of rock arm 13 and rock shaft 14 and is at a true right angle to vertical lines $a$ and $b$.

By reference to Fig. 1 it will be noted that when the pulley units A and B are adjustably positioned in opposite extreme speed change positions the axes thereof are equally spaced in opposite directions. Obviously therefore, when the pulley units are adjusted in their intermediate speed change positions, just halfway between the extreme positions illustrated, the axes of the pulley units A and B will be aligned in the plane of the line $e$. With the parts just arranged the pulley units A and B, throughout their very limited oscillatory pivotal adjustments on the axis 14, move so nearly in straight lines toward and from the axis of the driving and driven pulleys 8 and 10, respectively, that the tension on the driving and driven belts, respectively, remain substantially constant throughout the full range of speed adjustments.

In the arrangement illustrated the pulley units A and B are connected in series between the driving and driven pulleys 8 and 10, respectively, so that the ratio of speed change effected by pulley unit A, which is the first in the series, will be multiplied by a like amount through the pulley unit B, which is second in series, thereby creating a very great speed change possibility. For example, if the diameters of the pulley flanges of units A and B are such as to make possible a maximum speed ratio reduction of five to one between belts 41 and 42, this five-to-one reduction will be multiplied by five between belts 42 and 43, thereby making a total reduction through the transmission unit of twenty-five to one. Likewise, if the pulley diameters are such that the reduction effected by each of the units A and B independently is ten to one, the total reduction through the serially connected units A and B will be one hundred to one.

An important feature of this invention and one which was referred to in the introduction is the ability of the mechanism to automatically maintain true alignment of the several belts throughout the entire range of speed ratio changes. This important function is accomplished by mounting the pulley flanges 27, 29 and 28 of each unit A or B so that they are free for limited axial floating movements on the crank pins or spindles 26. With this construction when the units A and B are moved toward and from the driving and driven pulleys 8 and 10, respectively, the intermediate pulley flanges 29 shift axially on the sleeves 33 in respect to the cooperating relatively fixed pulley flanges 27 and 28. This shifting action of the intermediate pulley flange 29 of unit A tends to shift the engaged portions of belts 41 and 43 in one direction; whereas, simultaneous shifting of the intermediate flange 29 of unit B tends to shift the engaged portions of belts 42 and 43 in the opposite direction, so that overall tendency under speed change variation is to throw the several belts 41, 42 and 43 out of true alignment with their respectively engaged pulleys. However, in the arrangement described the pulley units A and B shift bodily on the crank pins 26 and always seek positions wherein the several belts are in true alignment, and this can best be seen by reference to dotted and full lines in Fig. 2, in connection with which Fig. 2 it may also be seen that spacing of the belts on pulley units A and B does not change throughout the entire range of adjustment.

Preferably the pulley flanges 27 and 28 are spaced apart just slightly less than the maximum width of the intermediate pulley flanges, so that the teeth 32 of the intermediate pulley flanges will always be engaged with the teeth of one or the other or both of the flanges 27 and 28.

It will be obvious to those skilled in the art that the axially floating pulley units A and B are adapted for independent use in a more or less conventional hook-up between suitable driving and driven pulleys, wherein the single axially floating pulley unit A or B would be mounted in a more or less straight-line arrangement between the driving and driven pulleys and would be provided with suitable means for shifting the same in the line of the driving and driven belts, with respect to the driving and driven pulleys. Otherwise stated, an axially floating pulley unit A or B can be substituted for the axially fixed pulley unit of the prior art Judelshon Patent 2,035,269 of March 24, 1936, and would function to automatically maintain alignment of the driving and driven belts throughout the entire range of speed variation adjustments. In such a case the pulley unit would be mounted on the shaft 9 of Judelshon for axially floating movements, and Judelshon's driving belt 28 would be run in one of the V-grooves of the pulley unit, and Judelshon's driven belt 29 would be run in the other V-groove of the substituted pulley unit A or B.

The efficiency and practicability of the transmission mechanism herein disclosed and claimed has been thoroughly demonstrated and is now being commercially produced and offered to the trade, and the drawings in this application have been produced from such a commercially available mechanism.

What I claim is:

1. A variable speed transmission mechanism comprising a laterally spaced parallel pair of multiple pulley units each including an axially spaced pair of inner and outer cone-faced pulley flanges and intermediate double cone-faced pulley flange means, means journaling the inner and outer pulley flanges of each pulley unit in axially spaced relation and the intermediate double cone-faced pulley flange means thereof for axial sliding movements between said inner and outer pulley flanges, whereby to form in each of the pulley units a plurality of axially spaced variable diameter V-grooves, and at least one belt coupling the opposite multiple pulley units together and running in at least one of but not all of the V-shaped pulley grooves of each of said units, other of the variable diameter V-grooves of one of the pulley units being adapted to receive at least one driving belt and other of the variable diameter V-grooves of the other of the pulley units being adapted to receive at least one driven belt.

2. The structure defined in claim 1 in which said at least one belt runs in corresponding V-grooves of the opposite pulley units.

3. The structure defined in claim 1 in which at least one of said pulley units is axially loosely mounted on its axis of rotation, and in further combination with means for limiting axial shifting movement to within predetermined limits.

4. The structure defined in claim 1 in which each of said pulley units is axially loosely mounted on its axis of rotation, and in further combination with means for limiting axial shifting movement to within predetermined limits.

5. The structure defined in claim 1 in further combination with at least one driving belt and at least one driven belt, said driving and driven belts running in other of the variable diameter V-grooves of the opposite pulley units than are occupied by said at least one unit coupling belt.

6. The combination with driving and driven pulleys, of a variable speed transmission mechanism comprising a laterally spaced parallel pair of multiple pulley units each including an axially spaced pair of inner and outer cone-faced pulley flanges and intermediate double cone-faced pulley flange means, means journaling the inner and outer pulley flanges of each pulley unit in axially spaced relation and the intermediate double cone-faced pulley flange means thereof for axial sliding movements between said inner and outer pulley flanges, whereby to form in each of the pulley units a plurality of axially spaced variable diameter V-grooves, at least one belt coupling the opposite multiple pulley units together and running in at least one of but not all of the V-shaped pulley grooves of each of said units, driving and driven belts, said driving and driven belts running respectively over the driving and driven pulleys and other of the variable diameter V-grooves of opposite pulley units than are occupied by said unit coupling belt, and means for effecting relative shifting movement of the said intermediate pulley flange means of opposite pulley units with respect to their inner and outer pulley flanges simultaneously and in opposite directions.

7. The combination with driving and driven pulleys, of a variable speed transmission mechanism comprising a laterally spaced parallel pair of multiple pulley units each including an axially spaced pair of inner and outer cone-faced pulley flanges and intermediate double cone-faced pulley flange means, means journaling the inner and outer pulley flanges of each pulley unit in axially spaced relation and the intermediate double cone-faced pulley flange means thereof for axial sliding movements between said inner and outer pulley flanges, whereby to form in each of the pulley units a plurality of axially spaced variable diameter V-grooves, at least one belt coupling the opposite multiple pulley units together and running in at least one of but not all of the V-shaped pulley grooves of each of said units, driving and driven belts, said driving and driven belts running respectively over the driving and driven pulleys and other of the variable diameter V-grooves of opposite pulley units than are occupied by said unit-coupling belt, and means for simultaneously varying in opposite directions the distances between one of the pulley units and the said driving pulley and the other of said pulley units and the said driven pulley.

8. The combination with driving and driven pulleys, of a variable speed transmission mechanism comprising a mounting structure, a laterally spaced parallel pair of multiple flange pulley units each including an axially spaced pair of inner and outer cone-faced pulley flanges and intermediate double cone-faced pulley flange means, means journaling the inner and outer pulley flanges of each pulley unit to the supporting structure in axially spaced relation and the intermediate double cone-faced pulley flange means thereof for axial sliding movements between their respective co-operating inner and outer pulley flanges, whereby to form in each of said pulley units a plurality of axially spaced variable diameter V-grooves, at least one belt coupling the opposite multiple pulley units together and running in at least one of but not all of the V-shaped pulley grooves of each of said units, other belts coupling the driving and driven pulleys to opposite of said pulley units and running in other of the variable diameter V-grooves than are occupied by said at least one unit coupling belt, means mounting the supporting structure for pivotal movements about an axis intermediate said opposite pulley units, and means for retaining pivotal adjustments of said supporting structure.

9. The combination with driving and driven pulleys, of a variable speed transmission mechanism comprising a mounting structure, a laterally spaced parallel pair of multiple flange pulley units each including an axially spaced pair of inner and outer cone-faced pulley flanges and intermediate double cone-faced pulley flange means, means journaling the inner and outer pulley flanges of each pulley unit to the supporting structure in axially spaced relation and the intermediate double cone-faced pulley flange means thereof for axial sliding movements between their respective co-operating inner and outer pulley flanges, whereby to form in each of said pulley units a plurality of axially spaced variable diameter V-grooves, at least one belt coupling the opposite multiple pulley units together and running in at least one of but not all of the V-shaped pulley grooves of each of said units, other belts coupling the driving and driven pulley to opposite of said pulley units and running in other of the variable diameter V-grooves than are occupied by said at least one unit coupling belt, means mounting the supporting structure for pivotal movements about an axis intermediate said opposite pulley units, and means for retaining pivotal adjustments of said supporting structure, said driving and driven pulleys being located on the same side of a line drawn between the axis of said opposite pulley units.

10. The structure defined in claim 6 in which the said driving and driven pulleys are arranged in laterally spaced parallel relation.

11. The structure defined in claim 7 in which said driving and driven pulleys are located in laterally spaced parallel relation.

12. The structure defined in claim 8 in which the said driving and driven pulleys are arranged in laterally spaced parallel relation.

13. The structure defined in claim 9 in which the said driving and driven pulleys are located in laterally spaced parallel relation.

14. The structure defined in claim 8 in which the said driving and driven pulleys are arranged in laterally spaced relation on the same side of a line drawn between the axis of said opposite pulley units.

15. The structure defined in claim 8 in which the said driving and driven pulleys are located on the same side of a line drawn between the axis of said opposite pulley units and are laterally spaced apart a distance at least not materially greater than the distance between the axis of opposite pulley units.

16. The structure defined in claim 8 in which the said driving and driven pulleys are laterally spaced apart and so arranged with respect to the opposite pulley units that substantially parallel lines drawn one between the axis of the driving pulley and one of the pulley units and the other drawn between the axis of the driven pulley and the other of the pulley units will intersect a line drawn between the axis of the opposite pulley units at approximately right angles.

17. The combination with driving and driven pulleys, of a variable speed transmission mechanism comprising a mounting structure, a laterally spaced plurality of multiple pulley units each including an axially spaced pair of inner and outer cone-faced pulley flanges and intermediate double cone-faced pulley flange means, means journaling the inner and outer pulley flanges of each pulley unit to the supporting structure in axially spaced relation and the intermediate double cone-faced pulley flange means thereof for axial movements between their respective co-operating inner and outer pulley flanges, whereby to form in each of said pulley units a plurality of axially spaced variable diameter V-grooves, at least one belt coupling each pulley unit to the next adjacent pulley unit and running in at least one of the V-shaped pulley grooves of each of two of said units, other belts coupling the driving and driven pulleys each to pulley units at opposite ends of the serially connected plurality of multiple pulley units and running in other of variable diameter V-grooves of said units, means mounting the supporting structure for pivotal movements about an axis intermediate the said opposite end pulley units, and means for imparting pivotal adjusting movements to and retaining pivotal adjustments of the supporting structure, said driving and driven pulleys being located on the same side of a line drawn between the axis of the said opposite end pulley units.

18. The structure defined in claim 17 in which the driving and driven pulleys are laterally spaced.

19. The combination with driving and driven pulleys, of variable speed transmission mechanism comprising a mounting structure, a laterally spaced plurality of multiple variable diameter pulley units each including an axially spaced plurality of variable diameter belt engaging pulleys, means for journaling the multiple pulley units to the supporting structure in laterally spaced relation, belt means coupling the pulley units in series and running over at least one variable diameter pulley of each of the units, other belts coupling the driving and driven pulleys each to a pulley unit at an opposite end of the serially connected plurality thereof and running over other of the variable diameter pulleys of the end units than are occupied by unit coupling belt means, means mounting the supporting structure for pivotal movement about an axis intermediate the end pulley units, and means for adjusting and retaining pivotal adjustments of said supporting structure, said driving and driven pulleys being located on the same side of a line drawn between the axis of opposite end pulley units.

20. The structure defined in claim 19 in which the said driving and driven pulleys are laterally spaced.

LLOYD CODDINGTON.